United States Patent
Zhou et al.

(10) Patent No.: US 9,540,928 B2
(45) Date of Patent: Jan. 10, 2017

(54) ROCK PROPERTY MEASUREMENTS WHILE DRILLING

(75) Inventors: Hang Zhou, Chatswood (AU); Peter James Hatherly, Lavender Bay (AU)

(73) Assignee: The University of Sydney, The University of Sydney, New South Wales (AU)

( * ) Notice: Subject to any disclaimer, the term of this patent is extended or adjusted under 35 U.S.C. 154(b) by 1115 days.

(21) Appl. No.: 13/575,599

(22) PCT Filed: Feb. 4, 2011

(86) PCT No.: PCT/AU2011/000116
§ 371 (c)(1),
(2), (4) Date: Jul. 26, 2012

(87) PCT Pub. No.: WO2011/094817
PCT Pub. Date: Aug. 11, 2011

(65) Prior Publication Data
US 2012/0323495 A1    Dec. 20, 2012

(30) Foreign Application Priority Data
Feb. 5, 2010  (AU) ................................ 2010900466

(51) Int. Cl.
*E21C 39/00*    (2006.01)
*G06T 17/05*    (2011.01)

(52) U.S. Cl.
CPC ............... *E21C 39/00* (2013.01); *G06T 17/05* (2013.01)

(58) Field of Classification Search
CPC .................................. E21C 39/00; G06T 17/05
See application file for complete search history.

(56) References Cited

U.S. PATENT DOCUMENTS

2006/0055403 A1* 3/2006 Freedman .............. G01V 11/00
324/303

FOREIGN PATENT DOCUMENTS

WO    WO 00/43811 A2    7/2000

OTHER PUBLICATIONS

LaBelle et al., "Material Classification by Drilling", 2000 Proceedings of the 17th ISARC, Taipei, Taiwan.*
Valli Jouni, "Investigation Ahead of the Tunnel Face by Use of a Measurement-While-Drilling System at Olkiluoto, Finland", May 2010 Posiva.*

(Continued)

*Primary Examiner* — Regis Betsch
(74) *Attorney, Agent, or Firm* — Blakely, Sokoloff, Taylor & Zafman LLP

(57) ABSTRACT

Described herein is a method and system for characterizing in-ground rock types from measurement-while-drilling data in a mining environment. The method includes the steps of drilling holes at a plurality of selected locations within a region of interest; collecting measurements while drilling to obtain an array of data samples (162) indicative of rock hardness at various drilling depths in the drill hole locations; obtaining a characteristic measure (163) of the array of data samples; performing Gaussian Process regression (164) on the characteristic measure; and applying boundary detection (166) to the rock hardness output data obtained from the Gaussian process model to identify the distribution (280) of at least one cluster of rock type within the region of interest.

29 Claims, 14 Drawing Sheets

(56) References Cited

OTHER PUBLICATIONS

PCT Notification of Transmittal of the International Search Report and the Written Opinion of the International Searching Authority, or the Declaration for PCT Counterpart Application No. PCT/AU2011/000116, 10 pages, (Apr. 1, 2011).

PCT Notification of Transmittal of International Preliminary Report on Patentability (Chapter II of the Patent Cooperation Treaty) for PCT Counterpart Application No. PCT/AU2011/000116, 15 pages, (May 17, 2012).

H. Zhou, et al., "A Hybrid GP Regression and Clustering Approach for Characterizing Rock Properties from Drilling Data", Australian Centre for Field Robotics, Technical Report ACFR-TR-2011-001, 12 pages, (Sep. 30, 2010).

H. Zhou, et al., "Spectral Feature Selection for Automated Rock Recognition using Gaussian Process Classification", Australasian Conference on Robotics and Automation (ACRA), 7 pages, (Dec. 2-4, 2009).

J. Gonzalez, "Application of Pattern Recognition Techniques to Monitoring-while-Drilling on a Rotary Electric Blasthole Drill at an Open-Pit Coal Mine", Department of Mining Engineering, Queen's University, 213 pages, (Nov. 2007).

S. Schneider, et al., "Gaussian Processes with OAD Covariance Function for Hyperspectral Data Classification", IEEE 22nd International Conference on Tools with Artificial Intelligence, pp. 393-400, (2010).

H. Zhou, et al., "Automated Rock Recognition with Wavelet Feature Space Projection and Gaussian Process Classification", IEEE International Conference on Robotics and Automation, pp. 4444-4450, (May 3-8, 2010).

C. E. Rasmussen, et al., "Gaussian Processes for Machine Learning", The MIT Press, Massachusetts Institute of Technology, ISBN 026218253X, www.GaussianProcess.org/gpml, 266 pages, (2006).

J. Nocedal, et al., "Numerical Optimization", Springer, 12 pages (including Cover Page, Table of Contents, and pp. 192-201), (2006).

R. Teale, "The Concept of Specific Energy in Rock Drilling", International Journal of Rock Mechanics and Mining Sciences, vol. 2, pp. 57-73, (1965).

Office Action for Australian Patent Application No. 2011213479, 3 pgs. (Feb. 12, 2014).

\* cited by examiner

ROCK PROPERTY MEASUREMENTS WHILE DRILLING

CROSS-REFERENCE TO RELATED APPLICATIONS

This patent application is a U.S. National Phase Application under 35 U.S.C. §371 of International Application No. PCT/AU2011/000116, filed Feb. 4, 2011, entitled ROCK PROPERTY MEASUREMENTS WHILE DRILLING, which claims priority to Australian Patent Application No. 2010900466, filed Feb. 5, 2010.

FIELD OF APPLICATION

This invention relates to a method and system for characterizing rock properties from drilling measurements. The invention is applicable in the mining industry and may particularly find use in automated mining environments.

BACKGROUND

It is useful, in a mining context, to have a knowledge of the distribution of different kinds of rock in the undisturbed earth. For example, it is useful to be able to identify the in-ground distribution of ore-containing rock, and distinguish the ore rock from surrounding rock types so that mine planners can best determine how to go about removing the ore from the ground. Identifying rock types is conventionally done manually by geologists using rock samples collected on site. This can be a dangerous, time intensive and expensive function, providing motivation to seek for an automated solution.

Developing a fully autonomous, remotely-operated open-pit mine is also a desirable goal in the mining industry for reducing risk to human life and increasing mining efficiency. One of the challenges encountered in autonomous mining is in building and maintaining representations of the in-ground geology to determine the quantity and quality of the minerals of interest. This is a motivation of the automated rock recognition system described herein, which aims to extract useful properties such as rock type and strength from blast hole drilling data, also called "measurement-while-drilling" (MWD) data. The rock recognition results are highly desired by the mining industry as they provide information that can be used in the optimization of the mine operations as well as mine planning and design. For instance, a rock boundary map can be important for blast hole pattern design as well as general strategic mine planning, and rock strength can be used to adjust the drilling parameters (e.g., rotation speed and penetration rate, etc.) as well as optimizing the explosives loading for blasting.

In the case of an open pit mine, the MWD data used for automated rock recognition are typically measurements collected from sensors on large drill rigs used for blast hole drilling in the mine. The MWD data are primarily used to control and monitor the drilling process, which may itself be performed autonomously.

Rock recognition essentially relates the MWD data, which is a reflection of the drill performance, in a meaningful way to the physical properties of the rocks being drilled. Under a supervised classification scheme, MWD data are first labelled by experienced geologists based on other geological data, from which a classifier is trained and then used to classify any new coming MWD data.

The idea of relating drilling measurements to the properties of rocks has been studied previously in an empirical or statistical way, such as in "The Concept of Specific Energy in Rock Drilling" by R Teale (*International Journal of Rock Mechanics and Mining Sciences*, 2:57-73, 1965). Machine learning techniques have also been applied to drilling data based rock recognition, including Neural Networks (NN), Conditional Random Field models and Gaussian Process classification. All these methods attempt to identify rock types solely on discretely distributed individual holes from the corresponding drill performance data. The supervised learning based rock recognition methods classify the rock types based on the model trained from the existing labelled datasets.

Supervised learning tries to find the causal connection between the input observations to the output labels by generating a function that maps inputs, which is the MWD data in this case, to the desired output which is the rock types. The difficulty of this learning task increases significantly if a clear causal relation between the input and the output does not obviously exist, which is the case in the present instance.

It will be understood that any reference herein does not constitute an admission as to the common general knowledge of a person skilled in the art.

SUMMARY OF THE INVENTION

In accordance with the present invention there is provided a method for characterizing in-ground rock types from measurement-while-drilling data in a mining environment, including:
  drilling holes at a plurality of selected locations within a region of interest;
  collecting measurements while drilling to obtain an array of data samples indicative of rock hardness at various drilling depths in the drill hole locations;
  applying the data array to a Gaussian process with selected covariance kernel to generate a Gaussian process model with optimized hyperparameters;
  sampling the Gaussian process model by performing Gaussian process regression at a selected spatial resolution within the region of interest; and
  applying boundary detection to the rock hardness output data obtained from the Gaussian process model to identify the distribution of at least one cluster of rock type within the region of interest.

Each data sample indicative of rock hardness at a given location may be calculated from a plurality of different measurements while drilling at the corresponding hole location and drill depth. Particular drilling measurements found useful for this application include the drill penetration rate, pull down pressure and rotation pressure. Data samples indicative of rock hardness may be calculated according to the corresponding penetration rate divided by the product of pull down pressure and rotation pressure square-root.

The Gaussian process kernel may be in the form of a rational quadratic kernel.

Boundary detection to identify rock type distribution may include applying at least one predetermined threshold value to the rock hardness output data obtained from the Gaussian process model.

In accordance with the present invention there is also provided a system for mapping in-ground rock types from measurement-while-drilling data in a mining environment, including:
  a drill equipped with at least one sensor for generating measurements while drilling data indicative of the hardness of the rock being drilled, and a spatial position sensor for generating spatial position information corresponding to the measured rock hardness data within a region of interest;

a data storage for storing an array of measured rock hardness data and corresponding spatial position information generated by the drill sensors within the region of interest;

a training processor adapted to apply the stored data array to a Gaussian process with selected covariance function to generate and store a Gaussian process model with optimized hyperparameters;

an evaluation processor for sampling the Gaussian process model by performing Gaussian process regression at a selected spatial resolution within the region of interest; and a boundary detection processor for discerning the distribution of at least one rock type in the region of interest from the Gaussian process output sample data.

The array of data indicative of rock hardness may be calculated from the measurement outputs of a plurality of drill sensors. In particular, the plurality of drill sensors may include sensors for measurements of drill penetration rate, pull down pressure and rotation pressure.

Data indicative of rock hardness may be calculated according to the corresponding measured penetration rate divided by the product of pull down pressure and rotation pressure square-root.

The selected covariance kernel may be in the form of a rational quadratic kernel.

The boundary detection processor may operate to identify rock type distribution by applying at least one predetermined threshold value to the rock hardness output data obtained from the Gaussian process model.

In accordance with the present invention there is also provided a method for mapping the distribution of in-ground rock types in a mining environment, including: recording measurements from a plurality of drill sensors whilst drilling a plurality of holes through rock within a region of interest; using the recorded sensor measurements to generate an array of data samples indicative of rock hardness at various drilling depths in the plurality of drill hole locations; applying the data array to a Gaussian process with selected covariance kernel to generate a Gaussian process model with optimized hyperparameters; sampling the Gaussian process model by performing Gaussian process regression at a selected spatial resolution within the region of interest; and discerning a distribution map of in-ground rock types within the region of interest by applying boundary detection to the rock hardness sample data output from the Gaussian process model to identify the distribution of at least one cluster of rock type within the region of interest.

The plurality of drill sensors may include sensors for measurement of drill penetration rate, pull down pressure and rotation pressure.

The data samples indicative of rock hardness may be generated according to the corresponding drill penetration rate divided by the product of pull down pressure and rotation pressure square-root.

The selected Gaussian process covariance kernel may be a rational quadratic kernel.

Boundary detection to identify rock type distribution may include applying at least one predetermined threshold value to the rock hardness sample data output obtained from the Gaussian process model.

According to another aspect of the invention there is provided a method for characterizing in-ground rock types from measurement-while-drilling data in a mining environment, including: drilling holes at a plurality of selected locations within a region of interest; collecting measurements while drilling to obtain an array of data samples indicative of rock hardness at various drilling depths in the drill hole locations; obtaining a characteristic measure of the array of data samples; performing Gaussian Process regression on the characteristic measure; and applying boundary detection to the rock hardness output data obtained from the Gaussian process model to identify the distribution of at least one cluster of rock type within the region of interest.

BRIEF DESCRIPTION OF THE DRAWINGS

The following description explains details of the invention to enable it to be more fully understood in the context of an embodiment thereof, also referring to the illustrations in the accompanying drawings in which:

FIGS. 8-12 chart experimental results from application of an embodiment of the invention in a real-world mine environment. In particular:

FIG. 8 shows experimental data on one of the benches;

DETAILED DESCRIPTION

Figure 1A:
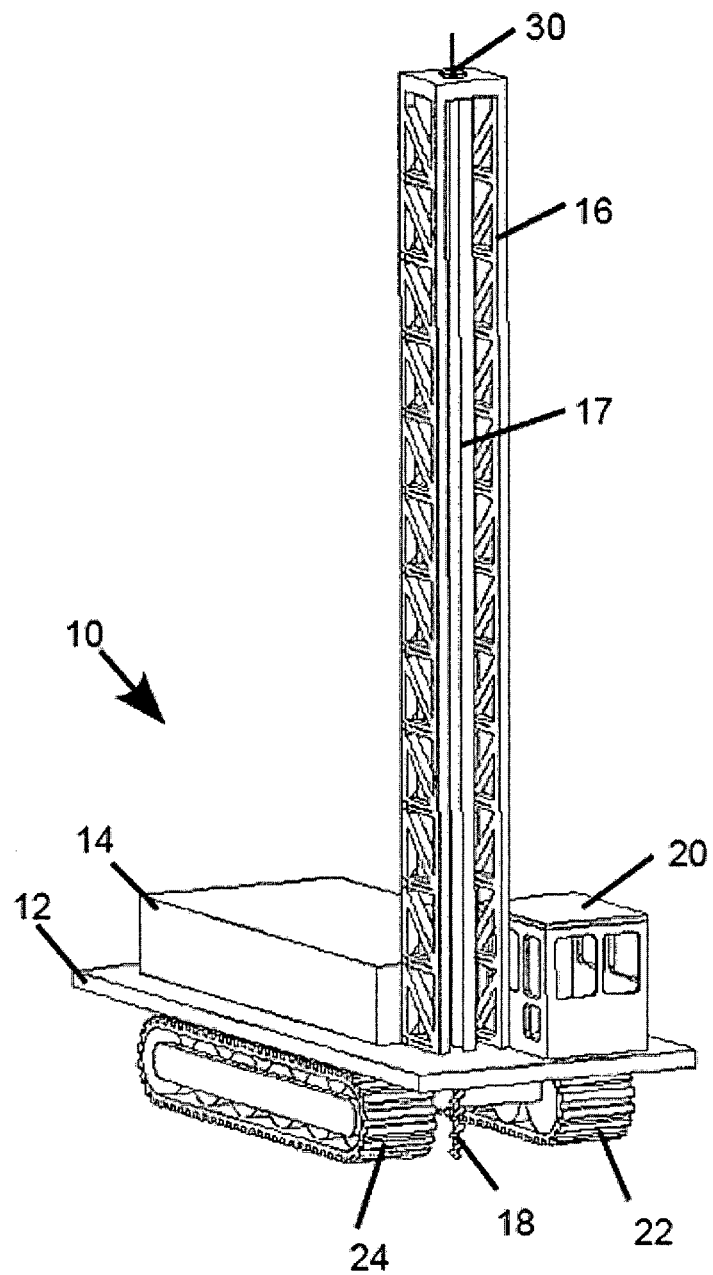
FIG. 1A shows a surface drilling rig for use in mining.

Identifying rock types is conventionally done manually by geologists from rock samples collected on site. This can be a dangerous, time intensive and expensive function, providing motivation to seek for an automated solution. It is therefore desirable to enable automated rock recognition, preferably from data that is already available during the course of mining operations.

Open-pit mining, a widely used economical mining method, usually involves operating large mining equipment in remote and potentially hazardous environments. It is therefore desirable to develop automation technology in this field to achieve higher efficiency and safety. In a large scale environment like an open-cut mine spatial modelling of geography and geology can have many uses in planning, analysis and operations within the mining environment. In the case of automated mining, a geographical model or terrain map can be used to guide robotic vehicles, whilst an in-ground geological model of the ore body may be used to determine drilling and blasting operations.

A digital representation of the operating environment in the form of a spatial model can be generated from sensor measurements which provide sample representations of the actual environmental variable(s) being modelled (e.g. elevation in the case of a terrain map, or ore grade in the case of in-ground ore body modelling) at various spatially distinct locations within the operating environment. The measured sample data is then treated in some manner such as by interpolation to determine information about the environment in locations other than those actually measured.

One of the challenges encountered in autonomous mining is in building and maintaining representations of the in-ground geology to determine the quantity and quality of the minerals of interest. This is a motivation of the automated rock recognition system described herein, which aims to extract useful properties such as rock type and strength from blast hole drilling data, also called "measurement-while-drilling" (MWD) data. The rock recognition results are highly desired by the mining industry as they provide information that can be used in the optimization of the mine operations as well as mine planning and design. For instance, a rock boundary map can be important for blast hole pattern design as well as general strategic mine planning, and rock strength can be used to adjust the drilling parameters (e.g., rotation speed and penetration rate, etc.) as well as optimizing the explosives loading for blasting.

A 3D model is described herein for reliably classifying rock type from the drilling data. It captures the featured measurement—"Adjusted Penetration Rate" that reflects the rock hardness. From the Adjusted Penetration Rate collected at discrete blast holes, the continuous rock hardness distribution is recovered by GP regression, which can then be reliably related to rock type by a preset threshold. Unlike supervised classification, the proposed solution does not rely on initial labelling. It works well across benches with varied geology, where the supervised classification usually fails to work.

1. System Overview

Central to mining operations is a surface drilling rig. This tracked vehicle drills multi-meter-deep holes into the ground that are subsequently blasted so to extract ore. Drill hole positions are carefully planned in regular patterns according to the mine layout and in-ground geology.

A surface drilling rig vehicle 10 is shown in FIG. 1A. The drill rig vehicle 10 as shown in the drawing has a large chassis 12 carried on left and right tracked conveyances 22, 24. The chassis 12 supports the engine and other essential mechanical equipment 14 toward the rear of the vehicle, whilst at the front is a control cabin 20 and elongate upright drill mast 16. The drill mast supports an upright drill shaft 17 which extends down through the chassis 12 and terminates with a drill boring tool 18 beneath the vehicle. In use, the drill rig vehicle moves over the surface of an open-pit mine on the tracked conveyances 22, 24 driven by the engine 14. At a chosen drilling location the vehicle is positioned with the drill boring tool over the desired ground location. The drill rig is then operative to drill a hole in the ground by using the engine 14 to drive the drill boring tool and shaft into the soil/rock to a desired depth. When the hole is complete the vehicle is moved to the next chosen drilling location within a predetermined drill hole pattern.

The drill rig vehicle 10 is equipped with measurement-while-drilling (MWD) sensors (not shown in the drawing) which are primarily for controlling and monitoring the drilling process. The MWD sensors may include accelerometers, tachometers, pressure transducers, torque sensors, and the like, for measurement of drill related quantities as is known in the industry. The drill rig vehicle is also equipped with a GPS positioning sensor 30 for accurately determining the location of the vehicle, and in particular the location of holes drilled.

Figure 1B:
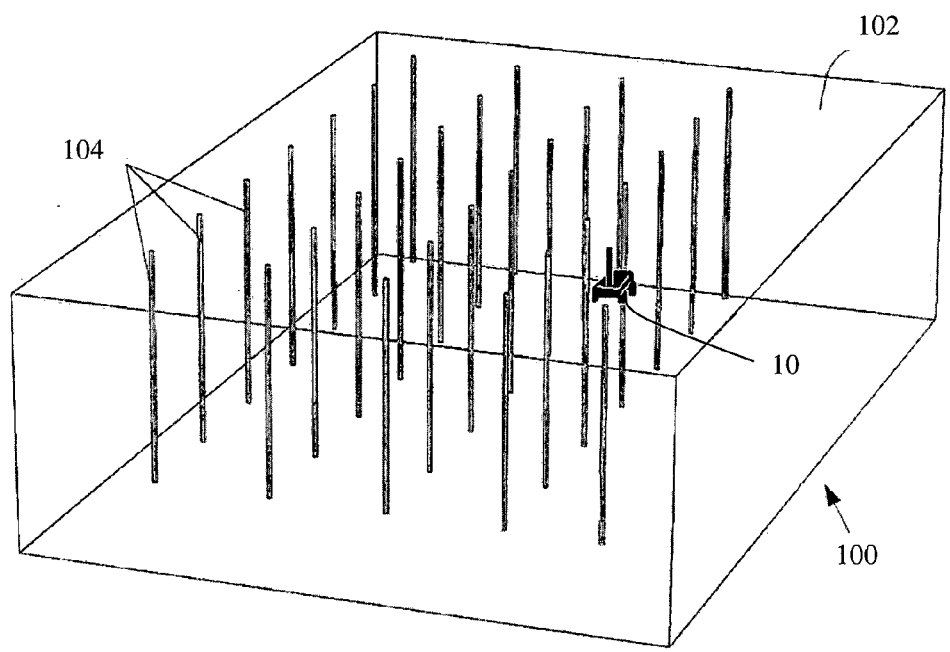
FIG. 1B is a diagrammatic illustration of a surface drilling rig operative to drill a pattern of blasting holes in a shelf of an open pit mine.

FIG. 1B schematically illustrates the drill rig vehicle 10 on the surface 102 of an open pit mine shelf 100. In order to access ore-containing rock beneath the surface of the shelf 100 the drill rig vehicle can be used to bore a pattern of individual blast holes 104 which can be filled with explosives. The choice of shelf and region to be blasted, the drill pattern, and the placement of individual holes may be determined by mine planners and engineers on the basis of many known factors such as the mine topography, rock geology, etc. For example, harder rock may require blast hole locations to be closer to one another.

During the course of drilling operations, measurements that can be used for characterizing the in-ground material are collected and recorded from the various sensors on the drill rig. This includes measurement-while-drilling (MWD) data, which is primarily used to control and monitor the drilling process but can also be employed for rock recognition as described herein below. Positional information about the drill rig corresponding to the MWD data collected is also recorded, for example using GPS positioning technology, as well as drill depth information. The three-dimensional drill rig position and drill depth provide a defined location for each MWD data sample collected during drilling. During drilling, sensors such as accelerometers, tachometers, pressure transducers and torque sensors are used to collect MWD measurements.

Figure 2:
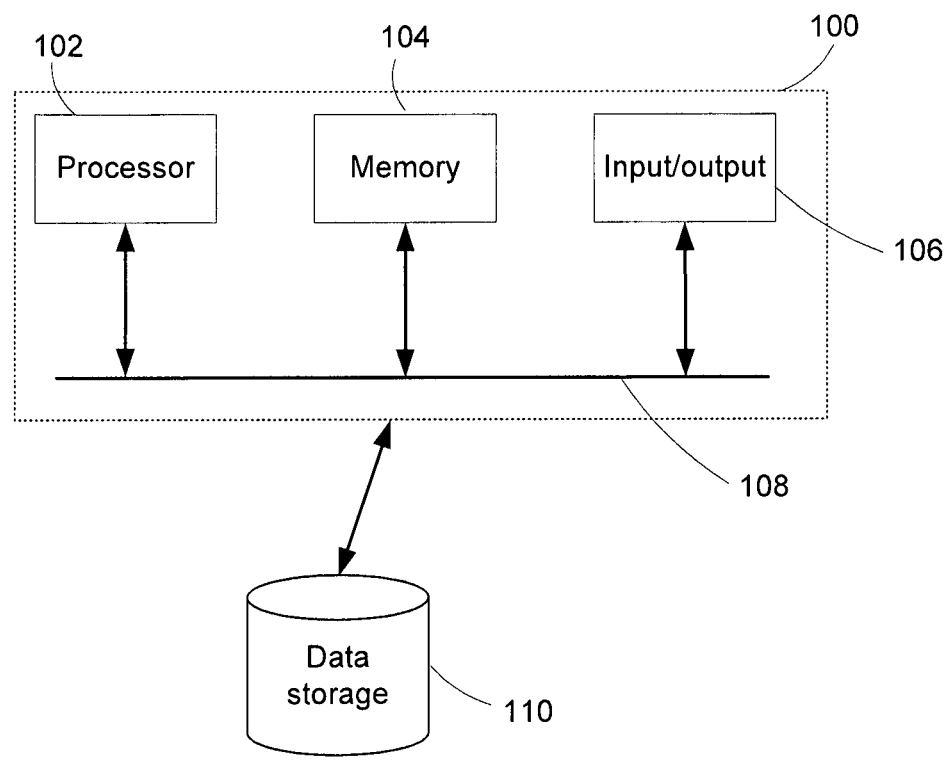
FIG. 2 is a representative diagram of an example computing system which may be used to implement a data modelling system in accordance with an embodiment of the invention.

Referring to FIG. 2, the data modelling system described herein can be implemented with the aid of appropriate computer hardware and software in the form of a computing system 101. The computing system 101 may comprise a processor 102, memory 104 and input/output 106. These components communicate via a bus 108. The memory 104 stores instructions executed by the processor 102 to perform the methods as described herein. Data storage 110 can be connected to the system 100 to store input or output data. The input/output 106 provides an interface for access to the instructions and the stored data. It will be understood that this description of a computing system is only one example of possible systems in which the invention may be implemented and other systems may have different architectures.

The computing system 101 can be in the form of an onboard computing system located in the drill rig vehicle 10. Alternatively, the computing system 101 can be in the form of a distributed system so that the computing system 101 is located separate from the drill rig vehicle 10, for example offsite. In this case, the information obtained by the drill rig vehicle 10 can be sent to the computing system 101 via a wireless connection, for example in real time. Alternatively the information can be transferred to the computing system 101 at a later stage by, for example, downloading sensor data from the drill rig vehicle 10 and inputting it to the computing system 101.

Figure 3:
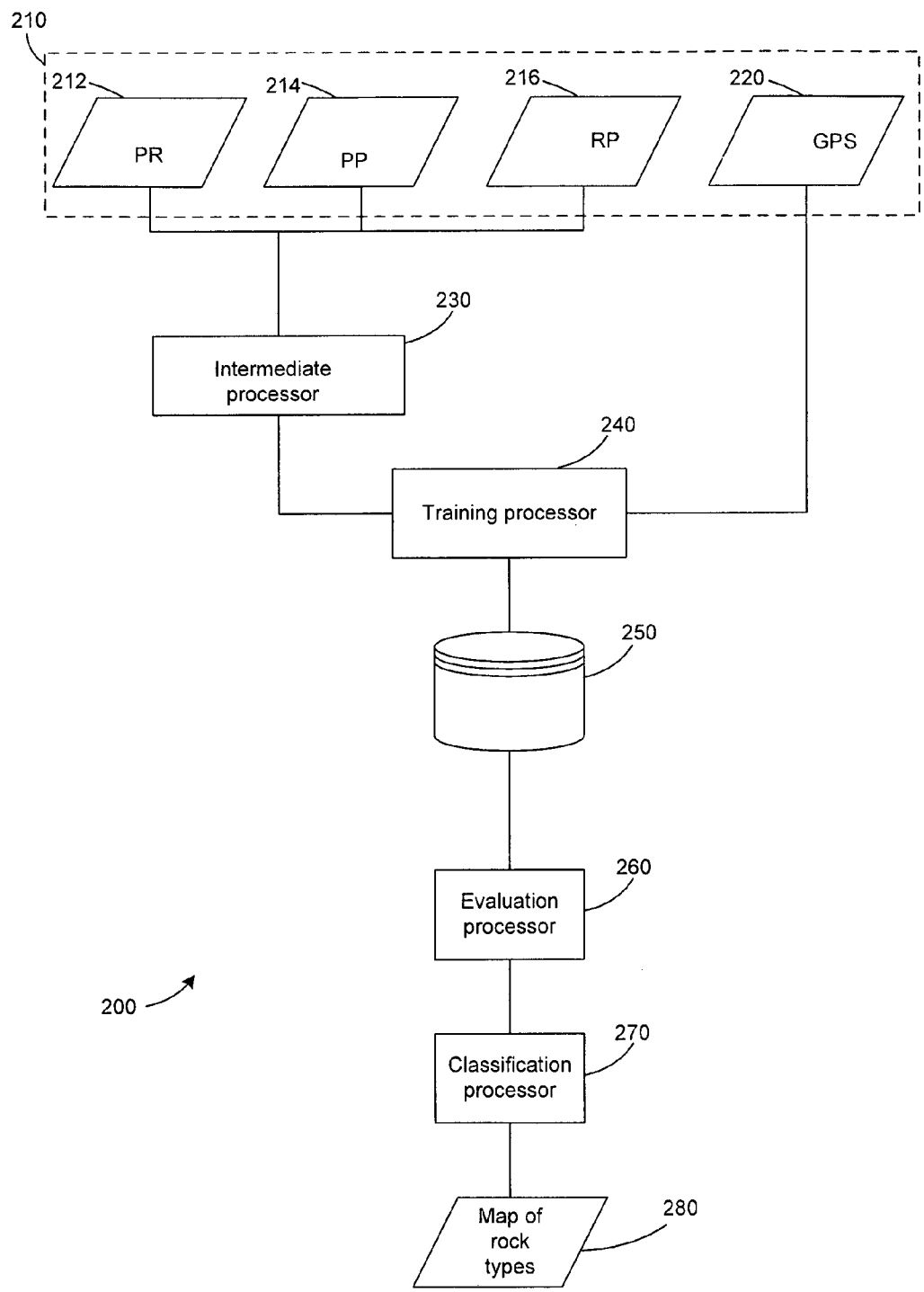
FIG. 3 is a block diagram illustrating a system for characterizing rocks from drilling data in accordance with an embodiment of the invention.

FIG. 3 is a block diagram illustrating a system 200 for generating a three-dimensional rock hardness distribution model from measurements collected whilst drilling in a mine environment taking into account the considerations discussed above. The system 200 includes a plurality of sensors 210 which in use are on-board a surface drilling rig such as a Terex Reedrill SKSS-15 drill rig. In this case, sensors 212, 214, 216 generate MWD data representing the drill penetration rate (PR), pull-down pressure (PP) and rotation pressure (RP) respectively. Sensor 220 provides positional information from the drill rig to enable the three-dimensional position of the drill to be determined corresponding to each sample of the MWD data. The position information provided by sensor 220 may include GPS data representing the position of the drill rig 10 as well as depth data representing the depth of the drill end below the surface on which the drill rig stands.

An intermediate processor 230 is coupled to receive data from the MWD sensors. The intermediate processor 230 is used to determine a characteristic measure 153 of the data as described with reference to FIG. 5A below. The specific characteristic measure determined in this embodiment is an Adjusted Penetration Rate (APR) is determined as shown at step 163 in FIG. 5B.

The adjusted penetration rate data, which is a reflection of rock hardness, is supplied to a GP training processor 240 along with the corresponding spatial position information from sensor 220. The training processor 240 is adapted to organise the sensor data and determine a non-parametric, probabilistic, multi-scale representation of the data for use in modelling the in-ground spatial distribution of ore, which is stored in the data storage 250. Details of specific operational procedures carried out by the training processor are described herein below and particularly with reference to FIG. 6.

A GP evaluation processor 260 is also coupled to access the data storage 250 and is adapted to utilise the measurement data from the data storage 250 and Gaussian process model data according to a desired modelling grid resolution. Specific operational details of the evaluation processor are provided herein below and particularly with reference to FIG. 7. The evaluation processor 260 applies a GP regression on the adjusted penetration rate data according to the training data and Gaussian process covariance function hyperparameters learnt by the training processor and stored in data storage 250.

Figure 5A:
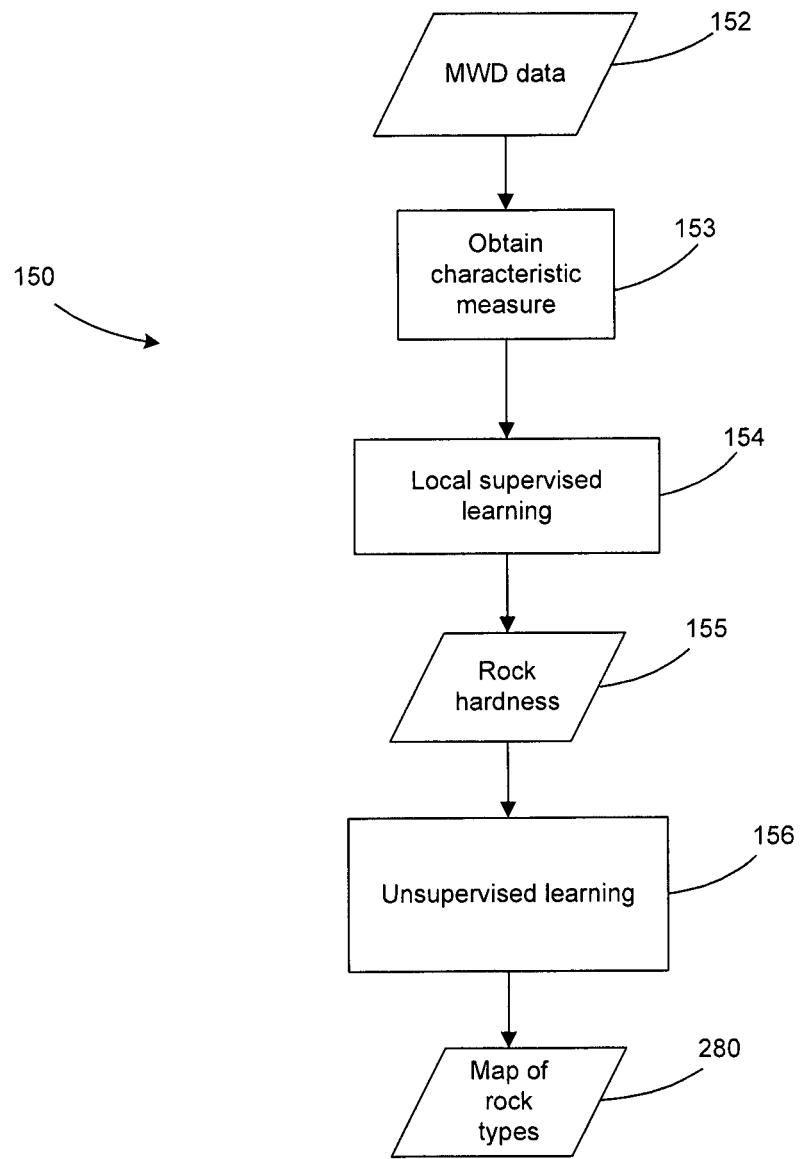
FIGS. 5A and 5B are block diagrams showing a process for estimating rock types from measured MWD data.

The training processor 240 together with the evaluation processor 260 are used to perform the local supervised learning as shown at step 154 in FIG. 5A. In particular, GP local regression is performed, as shown at step 164 in FIG. 5B, using the GP covariance function 167 as determined by the training processor 240.

The existing blast hole location grid as well as the corresponding adjusted penetration rate (normalized to the range of [0,1]) are taken as training data, where the data input is the 3D location (the east and north coordinates as well as the depth of the blast holes) of the existing blast holes and the data output is the corresponding adjusted penetration rate. The GP model (hyperparameters) is learned through this training data via GP regression. Then, a 3D location grid is defined which is more dense than the existing blast holes grid. A GP regression is applied to the grid with the GP model learned from the training data, and a correspondingly more dense distribution of the adjusted penetration rate is obtained. This is taken as the 3D continuous rock hardness distribution 155.

A classification processor 270 operates on the continuous rock hardness distribution generated by the Gaussian process regression. A rock type boundary of interest can then be discerned from the continuous rock hardness distribution by setting a corresponding threshold value to differentiate between the different mineral regions. The resulting output 280 is a rock type distribution map that can be used for mine planning and the like as discussed hereinabove.

The processors 230, 240, 260, 270 may be software processes running on a common platform or a distributed platform.

2. Data Analysis Method Overview

Rock recognition relates the MWD data, which is a reflection of the drill performance, in a meaningful way to the physical properties of the rocks being drilled. Under a supervised classification scheme, MWD data are first labelled by experienced geologists based on other geological data, from which a classifier is trained and then used to classify any new coming MWD data. The type of MWD measurements used for rock recognition in this work include:

1. Rotation Speed (RS)
2. Penetration Rate (PR)
3. Rotation Pressure (RP)
4. Pull-down Pressure (PP)
5. Bit Air Pressure (BAP)

Figure 4A:
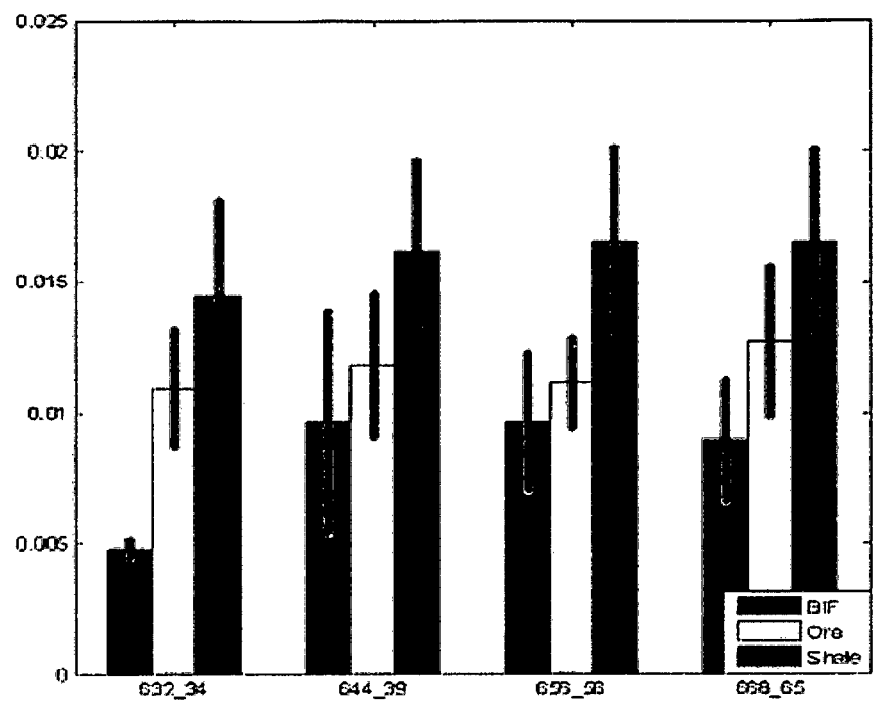
FIGS. 4A and 4B plot measured penetration rate and adjusted penetration rate for different rock types collected from four separate mining benches.
Figure 4B:
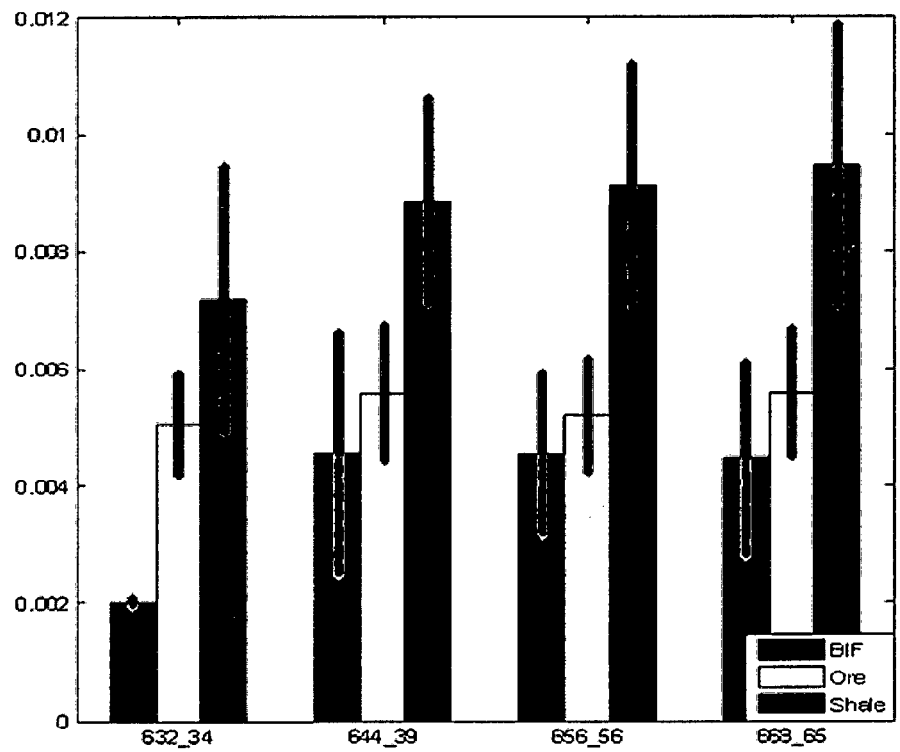

A significant difficulty in accurately predicting rock types from MWD data is that the geology changes among production benches in the mine. When reflected on the label, it shows that the same label corresponds to different MWD values or the same MWD values correspond to different labels. In other words, there is not a clear aggregation of the MWD data around a specific rock type. This problem is exemplified by some experimental results shown in FIG. 4A. The drawing illustrates a plot of one of the key MWD measurements—the Penetration Rate (PR)—with respect to the rock types (i.e. BIF, ore or shale) for data collected from four different mining benches. It can be seen there is a strong overlap on measured Penetration Rate between different rock types. FIG. 4B shows examples of an adjusted penetration rate, described in more detail below, that shows an improved distinction between different rock types.

In order to predict the rock types from the measured data an intermediate step is used, namely unsupervised learning. Unsupervised learning is a type of machine learning that can be used to organise data. In particular, clustering is a method of statistical data analysis used for grouping data into subsets, in this case different rock types.

A method and system for characterizing rock properties from drilling data in the context of an open pit mine is described herein. The approach described demonstrates an innovative way of rock classification by involving Gaussian process regression as an intermediate step. Features of the approach described include:

1) From the machine learning point of view, the approach described herein successfully combines supervised learning (GP regression) with unsupervised learning (unsupervised clustering) to learn a complex model on rock types from the MWD data, where there is not a direct connection between the input (MWD data) and the output (rock types). It is able to reliably predict the classification results without initial labelling (where labelling fails in this application due to the changing geology).

2) Looking from the application side, the methods described herein propose a continuous 3D rock type distribution model across the bench by applying Gaussian Process regression on the corrected drilling measurements ("Adjusted Penetration Rate") from multiple holes. This makes it possible to have a more accurate overall description of the rock distribution. Previously, rock types are identified solely on discretely distributed individual holes from the corresponding drill performance data.

3) The described method defines an "Adjusted Penetration Rate" which is the result of compensating the penetration rate dividing it by the product of pull down pressure and the rotation pressure square root. Experimental results have shown that the "Adjusted Penetration Rate" can effectively reflect the rock properties. This makes it possible to reveal the inherent connection between the drill mechanical measurements and the rock types, which is not explicitly reflected in the raw MWD data.

4) The described methods use a Gaussian Process regression model for rock recognition. Past applied machine learning methods are mainly classification methods, e.g., classification using Conditional Random Field (CRF), Neural Networks (NN) and unsupervised clustering, etc.

To model the in-ground geology distribution within a mine region, sample data can be generated from measurements representative of the geology or rock type at discrete locations within the mine pit region. The sample data can then be analysed and, using a method of interpolation, synthesised into a model that can be used to make predictions of the in-ground geology at spatial locations distinct from those that were measured. These estimates together with the measurements provide a more complete picture of the rock type distribution in the mine than the sample data taken alone.

Figure 5B:
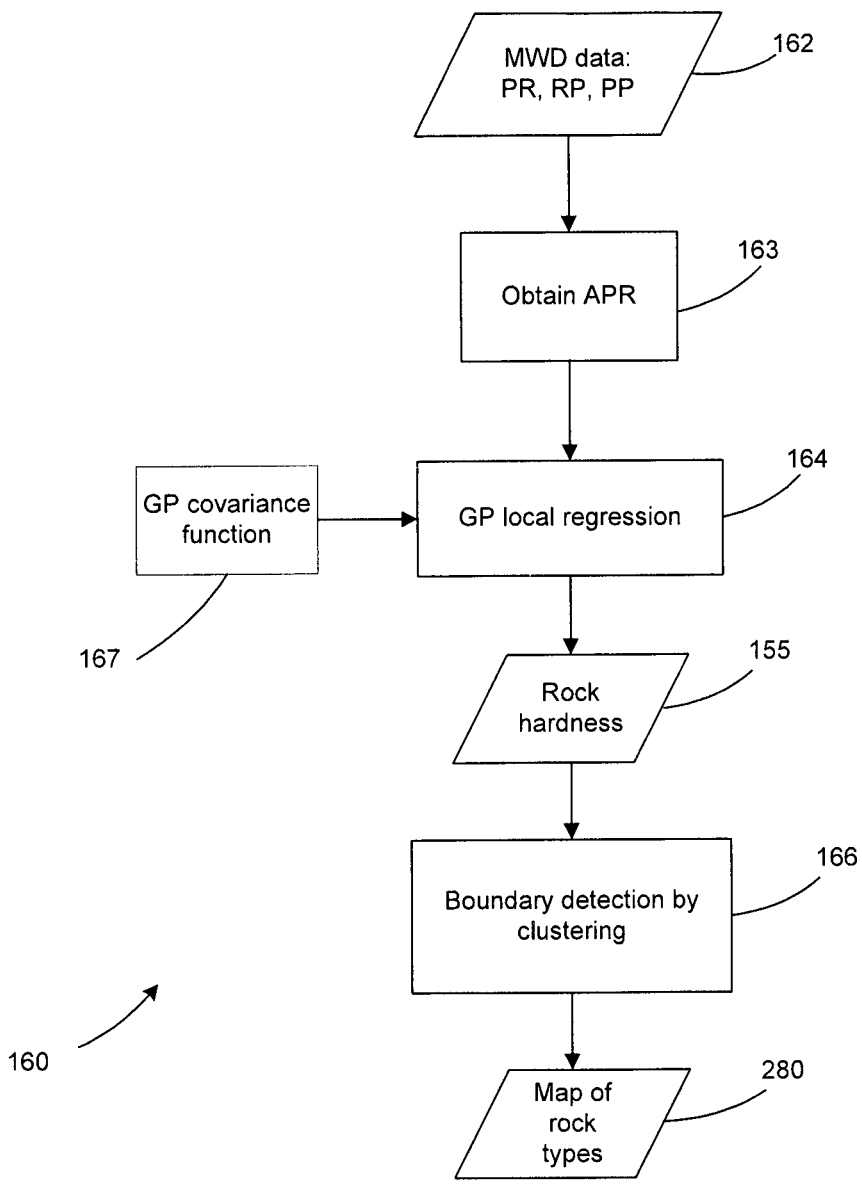

FIG. 5A is a block diagram 150 that illustrates the general approach taken to the rock recognition task in the present application. FIG. 5B shows more specific information about the method according to one embodiment.

In FIG. 5A MWD data 152 is obtained and used in the method 150 for obtaining a rock type distribution map 280. In FIG. 5B the MWD data 162 includes rock type indicator information such as includes penetration rate, pull down pressure and rotation pressure, and these data are obtained whilst drilling a plurality of holes in a region of interest. For each MWD data sample collected the spatial location of the corresponding drilled hole and the relevant depth in the hole is also recorded.

Instead of directly relating the MWD data 152 to a specific rock type (which as illustrated above, is difficult due to the changing geology), the connection between the MWD data and rock types is made indirectly. From the input MWD data, a characteristic measure is derived at step 153. With reference to the specific embodiment of the method 160 shown in FIG. 5B, the characteristic measure is referred to as the "Adjusted Penetration Rate" 153, which has been found to be substantially proportional to the rock hardness. The process of steps 153 (163) is performed by the intermediate processor 230 shown in FIG. 3.

From the adjusted penetration rate data a 3D continuous rock hardness distribution is recovered via supervised learning 154. As there does exist a clear causal relation from "Adjusted Penetration Rate" to rock hardness, a Gaussian Process 164 is applied to the calculated APR samples and corresponding spatial coordinates in order to learn the Gaussian process covariance function hyperparameters that represents the data. The learnt covariance function 167 is used in the Gaussian process regression 164 at a selected spatial resolution to infer a continuous rock hardness distribution.

The GP 164 used for the supervised learning step 154 is performed using the training processor 240 and the evaluation processor shown in FIG. 3.

Rock type distributions 280 are then determined from the calculated rock hardness distribution 155 using unsupervised learning 156. Specifically, as shown in FIG. 5B, the type of unsupervised learning that is used is boundary detection by clustering 166. In the simplest case this can be achieved by applying predetermined threshold values to the rock hardness distribution corresponding to boundaries between different rock types. With the obtained continuous hardness distribution (which is 1 meter apart on the 3 dimensions), the boundary is extracted through clustering by setting up the threshold for either the ore/shale or BIF/ore boundary.

3. Adjusted Penetration Rate

A full mathematical description of the drilling process as well as the interaction of the drill bit and the rock is a complex matter. Most practitioners develop understanding on the basis of experience. Penetration rate can be used as a key measurement on rock hardness, and that pull down pressure as well as rotation pressure are the major applied forces on changing the penetration rate. Therefore, it is assumed that under the same pull down pressure and rotation pressure, the penetration rate reflects the rock hardness.

However, either for manual drilling or autonomous drilling, the pull down pressure and rotation pressure are all subject to change. Usually, an increase in the pull down pressure is accompanied by a change in the rotation pressure. This change needs to be compensated so that the adjusted penetration rate reflects the rock hardness.

By analysing the MWD data samples in hand, it was found that the pull down pressure and the square root of the rotation pressure follows a linear relationship. The pull down rate is compensated by dividing it by the product of pull down pressure and the rotation pressure square root, and taking the result as adjusted penetration rate.

Referring to FIG. 5, the characteristic measure is determined in step 153. The characteristic measure is referred to as the adjusted penetration rate (APR) which is calculated according to:

$$APR = PR/(PP \cdot \sqrt{RP})$$

where PR is the measured penetration rate, PP is the measured pull down pressure, and RP is the measured rotation pressure.

4. Gaussian Process

A mathematical technique that has been found useful for analysing data in this way is the Gaussian process (GP), which is a stochastic process based on the normal (Gaussian) distribution and can be used to good effect as a powerful nonparametric learning technique for spatial modelling. Governed by an appropriate kernel or covariance function, the Gaussian process can be used to infer continuous values within the spatial domain from the distribution of sample measurements. The concept of Gaussian processes and their application are described in *Gaussian Processes for Machine Learning* (MIT Press, 2006) by C. E. Rassmussen and C. K. I. Williams.

4.1 Gaussian Process Regression

Gaussian processes provide a powerful learning framework for learning models of spatially correlated and uncertain data. Gaussian process regression provides a robust means of estimation and interpolation of elevation information and can handle incomplete sensor data effectively. GPs are non-parametric approaches in that they do not specify an explicit functional model between the input and output. They may be thought of as a Gaussian Probability Distribution in function space and are characterized by a mean function m(x) and the covariance function k(x,x') where $$m(x) = E[f(x)] \quad (1)$$

$$k(x,x')=E[(f(x)-m(x))(f(x')-m(x'))] \quad (2)$$

such that the GP is written as $$f(x) \sim GP(m(x),k(x,x')) \quad (3)$$

The mean and covariance functions together specify a distribution over functions. In the context of the problem at hand, each $x \equiv (x,y,z)$ and $f(x) \equiv RTI$ (Rock Type Indicator) of the given data. In this example, (x,y,z) are GPS position coordinates, and the RTI that is used is the APR.

The covariance function models the relationship between the random variables which, here, correspond to the given data. Although not necessary, the mean function m(x) may be assumed to be zero by scaling the data appropriately such that it has an empirical mean of zero. There are numerous covariance functions (kernels) that can be used to model the spatial variation between the data points.

4.2 Gaussian Process Training

Figure 6:
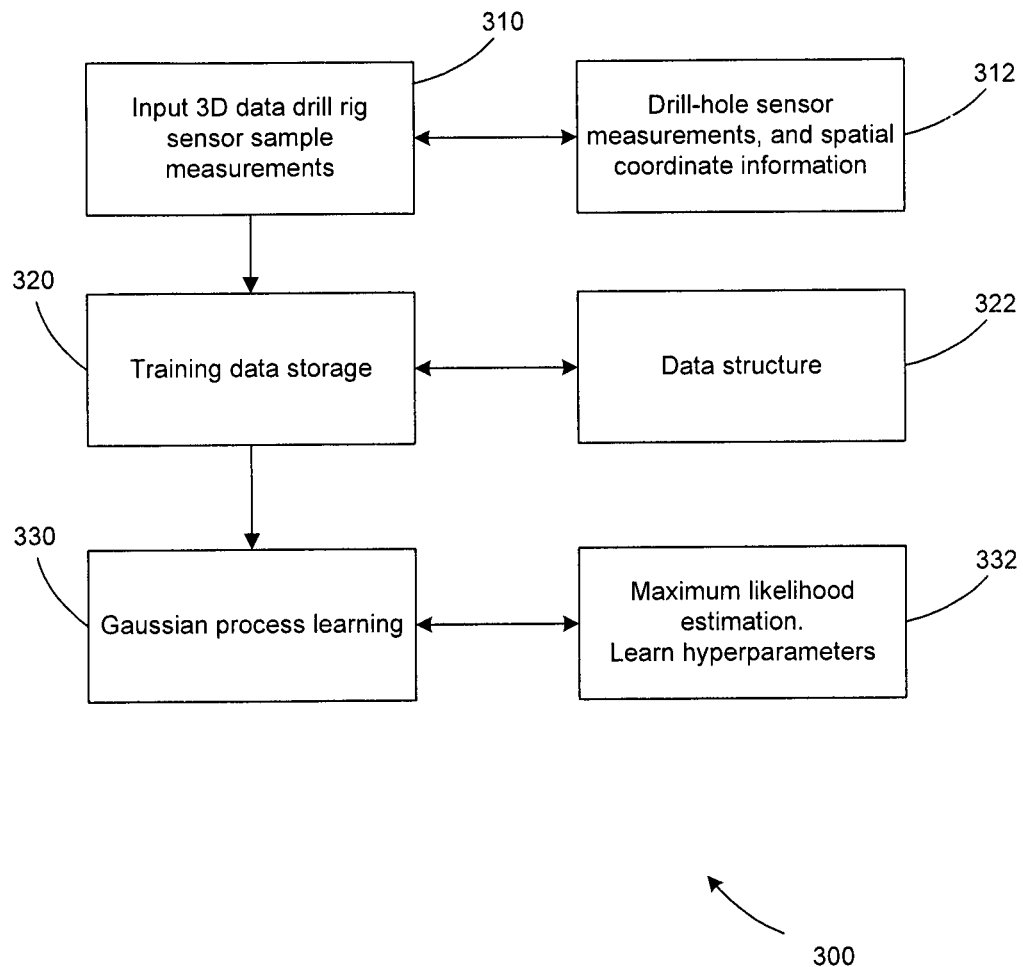
FIGS. 6 and 7 are flowchart diagrams outlining Gaussian process training and regression for use in the process of FIG. 5B.

FIG. 6 is a flow-chart diagram outlining the training phase procedure 300 for the ore distribution data modelling process. The procedure 300 begins with obtaining sensor measurement data at step 310 from an appropriate source, in this case MWD drill sensor measurements with corresponding 3-D spatial positioning information 312. In the present embodiment the penetration rate (PR), the pull down pressure (PP) and rotation pressure (RP) are of particular interest. The measurement dataset is stored, at step 320, in an appropriate data structure 322 for further use.

The data storage step 320 is followed by a Gaussian process learning procedure at step 330, with the objective of learning a representation of the spatial data.

Using a maximum likelihood approach, training the GP model on a given set of data amounts to finding the optimal set of hyperparameters that maximize the log marginal likelihood (Eq. 6). There are also various methods that can be used to optimise the hyperparameters. These include Broyden-Fletcher-Goldfarb-Shanno (BFGS) gradient descent and simulated annealing. A combination of these two methods can also be used. For example, a combination of stochastic search (simulated annealing) and gradient descent (Quasi-Newton optimization with BFGS hessian update) has been found to be successful. Using a gradient based optimization approach leads to advantages in that convergence is achieved much faster. A description and further information about these optimization techniques and others can be found in the text *Numerical Optimization*, by J. Nocedal and S. Wright (Springer, 2006).

Training the GP for a given data set is tantamount to optimizing the hyperparameters of the underlying covariance function. For the rational quadratic kernel this means finding the optimal set of values for $\theta = \{\alpha, l\}$. This is performed by formulating the problem in a Maximum Marginal Likelihood Estimation framework and subsequently solving a non-convex optimization problem.

Defining $X=\{x_i\}_{i=1}^n=(x_i,y_i)_{i=1}^n$ and $z=\{f(x_i)\}_{i=1}^n=(z_i)_{i=1}^n$ as the sets of training inputs and outputs respectively with n instances, the log marginal likelihood of the training outputs (z) given the set of locations (X) and the set of hyperparameters $\theta$ is given by $$\log(z \mid X, \theta) = -\frac{1}{2}z^T K_z^{-1} z - \frac{1}{2}\log|K_z| - \frac{n}{2}\log(2\pi) \quad (4)$$

Where $K_z=K(X,X)+\sigma_n^2 I$ is the covariance matrix for all noisy targets z and K(X,X) is covariance matrix for the noise-free targets (using equation 7 or 8 below).

The log marginal likelihood has three terms—the first describes the data fit, the second term penalizes model complexity and the last term is simply a normalization coefficient. Thus, training the model will involve searching for the set of hyperparameters that enables the best data fit while avoiding overly complex models.

Assume a data set D with m observations $D=\{(x_i,y_i), i=1, 2, \ldots, m\}$, where x is the input vector of dimension n and y is the class label $[-1, 1]$. The input n×m matrix is denoted as X. Predictions for new inputs x' are computed from the given training data using the GP model. Gaussian process binary classification is performed by first calculating the distribution over the latent function $f$ corresponding to the test case $$p(f'|X,y,x')=\int p(f'|X,x',f)p(f|X,y)df \quad (5)$$

where $p(f|y)=p(y|f)p(f|X)/p(y|X)$ is the latent variable posterior, and $p(f'|X, x', f)$ is the predictive posterior with respect to possible latent functions. As the values of this could lie anywhere within the range of $(-\infty, +\infty)$, a second step is necessary to obtain a probabilistic interpretation for the output:

$$\bar{\pi}'=p(y'+1|X,y,x')=\int s(f')p(f'|X,y,x')df' \quad (6)$$

where s can be any sigmoid function that 'squashes' the prediction output to guarantee a valid probabilistic value within the range of [0, 1].

In the present instance, a GP covariance function that is suitable is called the Rational Quadratic (RQ) kernel. The RQ kernel can be considered as a scale mixture (an infinite sum) of Radial Basis Function (RBF) kernels with different characteristic lengths. This is consistent with the relevant geology which is correlated at different scales.

The GP covariance function represents the prior on the rock property distribution, where the rock distribution is represented by the APR. It is one of the key factors in obtaining the right continuous distribution results.

The RBF kernel is given by $$k_{RBF}(r) = \exp\left(-\frac{r^2}{2l^2}\right) \quad (7)$$

where l is the characteristic length scale.
The RQ kernel is given by $$k_{RQ}(r) = \left(1 + \frac{r^2}{2\alpha l^2}\right)^{-\alpha} \quad (8)$$

where $\alpha, l>0$ are the kernel hyperparameters. The Rational Quadratic kernel can be considered as a scale mixture of the RBF kernel with different characteristic length scales.

This method provides for a non-parametric, probabilistic, multi-scale representation of the data. No explicit assumption of the underlying functional model is made. In particular, maximum likelihood estimation is used in order to optimise a set of hyperparameters associated with the Gaussian process covariance function. The covariance function hyperparameters provide a coarse description of the spatial model, and can be used together with the sensor measurement data to generate detailed model data at any desired resolution, including a statistically sound uncertainty estimate. The optimized covariance function hyperparameters are stored for use by the evaluation procedure 350 outlined below.

4.3 Gaussian Process Classification

Applying the GP model amounts to using the learned GP model to estimate the 3D rock type distribution within a region of interest, characterized by a selected grid of points at a desired resolution. The estimation is achieved by performing Gaussian process regression at the set of query points, given the training data set and the GP covariance function with the learnt hyperparameters.

Figure 7:
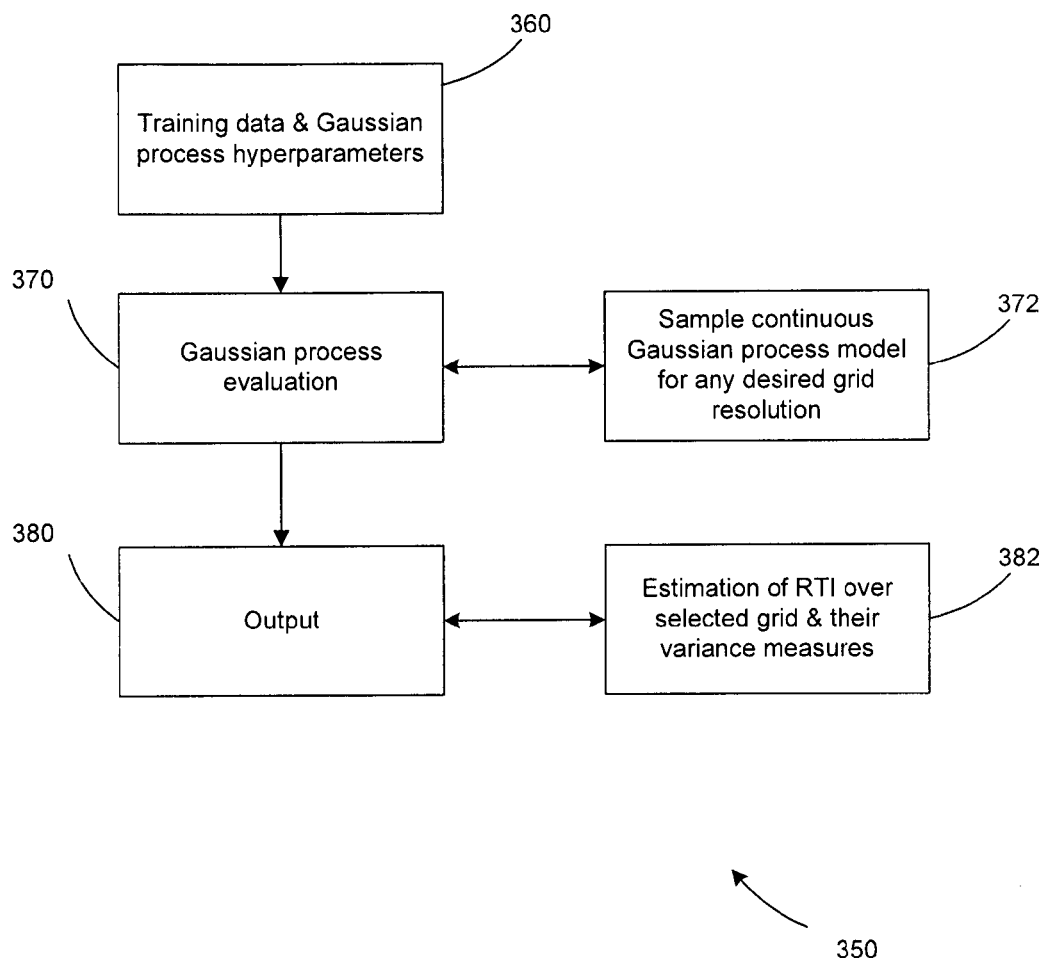

FIG. 7 is a flow-chart diagram outlining the evaluation phase procedure 350 for the data modelling process. The sensor measurement spatial data 312 and the Gaussian process model hyperparameters 332 obtained in the learning phase 300 are provided here at step 360. Since the Gaussian process representation obtained is a continuous domain one, applying the model for any desired resolution amounts to sampling the model at that resolution. This can be performed at the GP evaluation step 370 as outlined below.

The continuous GP model can be sampled for any desired grid resolution. A grid in the area of interest, at the desired resolution is formed at step 372. The objective is to use the learnt spatial model to conduct estimation at individual points in this grid. Each point in the grid is interpolated with respect to the model learnt in the previous step and the nearest training data around that point. This together with the learnt model provides an interpolation estimate for the desired location in the grid. The estimate resulting from this evaluation process 370 is also accompanied with an uncertainty measure that is simultaneously computed in a statistically sound manner.

For additive independent identically distributed Gaussian noise with variance $\sigma_n^2$ the prior on the noisy observations is given by $$\text{cov}(z_p, z_q) = k(x_p, x_q) + \sigma_n^2 \delta_{pq} \quad (9)$$

where $\delta_{pq}$ is a Kroeneker Delta function, $\delta_{pq} = 1$ iff p=q and 0 otherwise.

The joint distribution of any finite number of random variables of a GP is Gaussian. Thus, the joint distribution of the training outputs z and test outputs $f_*$ given this prior can be specified by $$\begin{bmatrix} z \\ f_* \end{bmatrix} \sim N\left(0, \begin{bmatrix} K(X,X) + \sigma_n^2 I & K(X, X_*) \\ K(X_*, X) & K(X_*, X_*) \end{bmatrix}\right) \quad (10)$$

For n training points and $n_*$ test points, $K(X, X_*)$ denotes the $n \times n_*$ matrix of covariances evaluated at all pairs of training and test points and similarly for $K(X,X)$, $K(X_*, X_*)$ and $K(X_*, X)$. The function values ($f_*$) corresponding to the test locations ($X_*$) given the training inputs X, training outputs z and covariance function is given by $$\bar{f}_* = K(X_*, X)[K(X,X) + \sigma_n^2 I]^{-1} z \quad (11)$$

and their uncertainty is given by $$\text{cov}(f_*) = K(X_*, X_*) - K(X_*, X)[K(X,X) + \sigma_n^2 I]^{-1} K(X, X_*) \quad (12)$$

The output 380 of the Gaussian process evaluation from step 370 is a digital representation of a spatial distributed quantity (proportional to rock hardness) at the chosen resolution and region of interest together with an appropriate measure of uncertainty for every point in the "map". The output provided by the evaluation process is an estimate 382 of a Rock Type Indicator (in this case an APR) over a selected grid, together with their variance measures.

The continuous rock hardness distribution can then be normalized and thresholds applied to discern rock type boundaries, as described below.

From a signal processing point of view, the continuous distribution recovery by means of GP regression can also be understood as reconstructing an original signal from the discrete samples. According to the Nyquist-Shannon sampling theorem, the band limited signal can be perfectly reconstructed at the sampling rate which is two times the highest frequency of the original signal. In the present case the samples are typically collected on the order of 0.1 m intervals in depth and 5-6 m in north and east direction, whereas the geology hardly has any change within such an interval. Intuitively, that means enough samples are collected before there is a significant change of the geology, which meet the requirements of the sampling theorem.

5. Unsupervised Learning

Referring to FIG. 5A, unsupervised learning is performed at step 156 on the estimated distribution produced by GP regression 154.

Unsupervised learning is a type of machine learning that can be used to organise data. In particular, clustering is a method of statistical data analysis used for grouping data into subsets, in this case different rock types. In the simplest case clustering can be achieved by applying predetermined threshold values to the rock hardness distribution corresponding to boundaries between different rock types. As shown in FIG. 5B, the unsupervised learning in this embodiment is done using boundary detection by clustering 166.

Clustering organizes the data into clusters so that there is a high intra-cluster similarity and low inter-cluster similarity. The similarity is defined by a distance measure. Common distance measures include Euclidean distance, Mahalanobis distance and Hamming distance.

Clustering includes two major types: hierarchical clustering and partitional clustering. Partitional clustering includes methods like K-means (where data points are assigned to the nearest centre) and Gaussian Mixture Models (where clusters are characterized by a mixture of Gaussian distributions).

Since what is mainly considered here is a 2D projection (called a plan view in the mining industry) of the RTI, some image segmentation methods can also be used as alternative ways to categorize the 2D projection of the continuous APR values.

The clustering 166 is performed by the classification processor 270 shown in FIG. 3, and the output of the process is a rock type distribution map 280.

Figure 8:
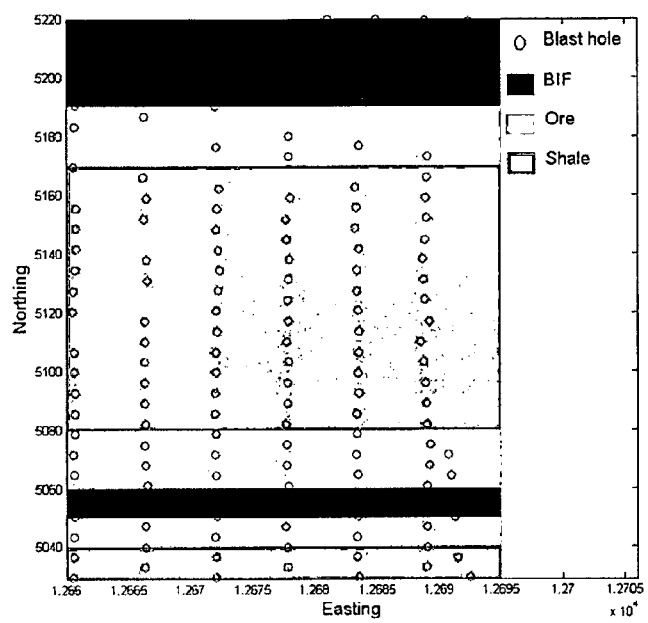
Figure 9A:
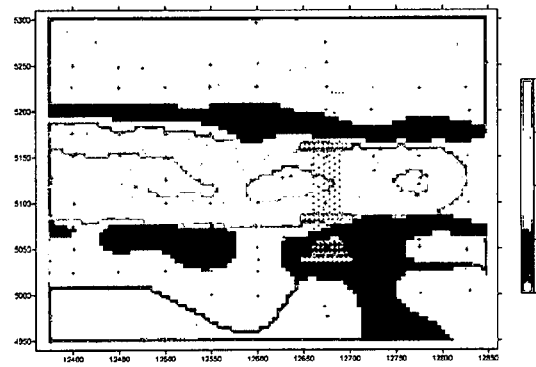
FIG. 9A shows a chemistry model for geological analysis results.
Figure 9B:
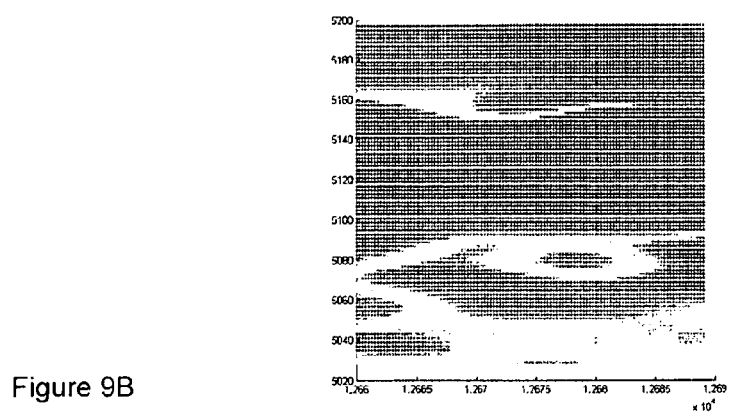
FIG. 9B shows a logging model for geological analysis results.

6. Experimental Results of Gaussian Process Regression Model Using Adjusted Penetration Rate The system and algorithms described herein for characterizing rock properties from drilling data have been tested on data collected from four benches of an existing open pit mine. FIG. 8 indicates the distribution of the blast holes as well as the assumed rock type boundary "ground truth" (as the precise actual unmined geological ground truth is never known) of one bench. The "ground truth" is obtained through experienced geologists' analysis on varied geological data sources, two of which are shown in FIG. 9, i.e., chemistry and geological logging analysis. In this way, a reasonable approximation of the real ground truth can be obtained.

Figure 10A:
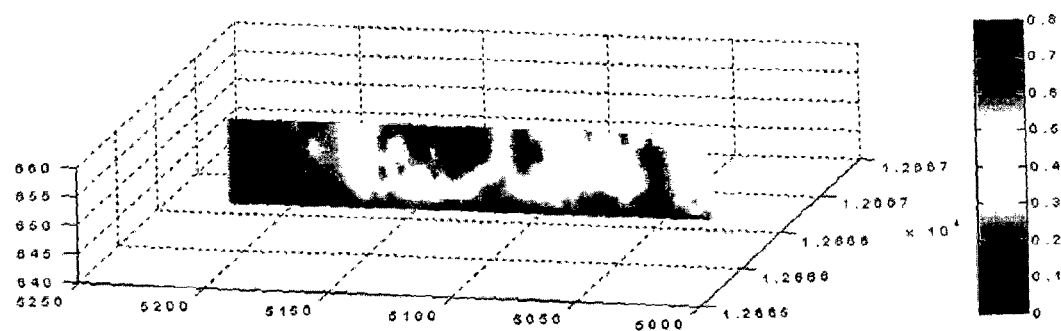
FIG. 10A shows a vertical slice of a 3D model.
Figure 10B:
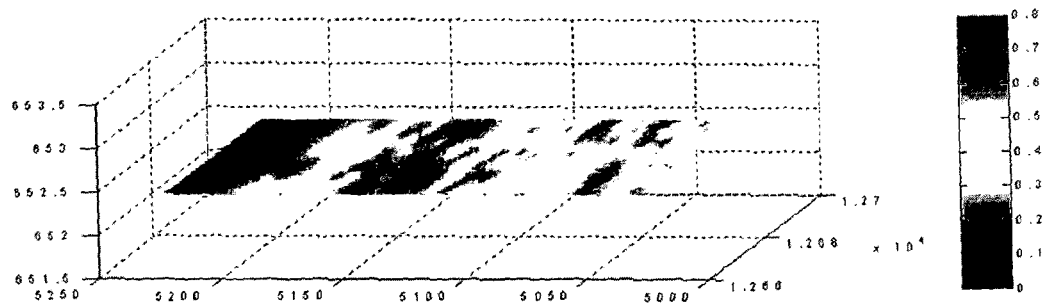
FIG. 10B shows a horizontal slice of the 3D model.

The approach described herein works well on data from all of the four benches tested. The most complicated case has been selected as an example to show the results in FIG. 10. FIG. 10A is a illustrates a vertical slice towards the north and FIG. 10B represents a horizontal slice at a depth of 3.5 meters. The differently shaded areas represent variations in the adjusted penetration rate, which are difficult to distinguish on the monochrome drawing herein but are easily discernable on the original colour diagram in which more red colour corresponds to a higher penetration rate and the more blue for lower penetration rate.

Figure 10C:
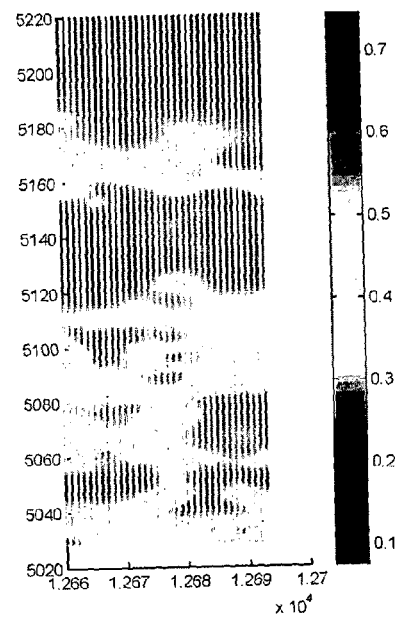
FIG. 10C shows a projection on a 2D plane.
Figure 10D:
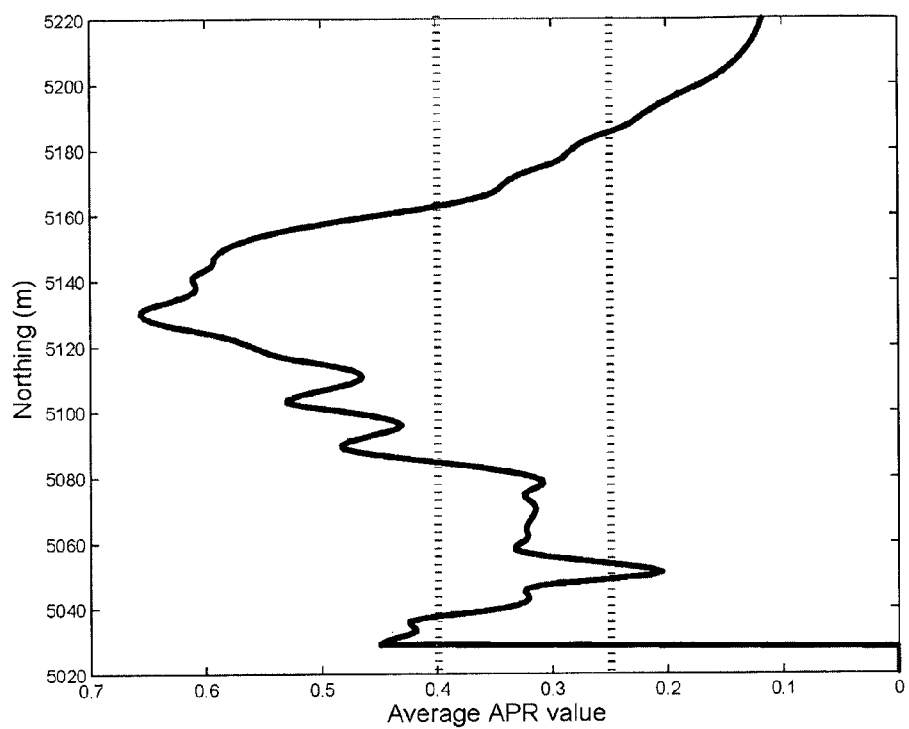
FIG. 10D shows a projection on 1D.
Figure 10E:
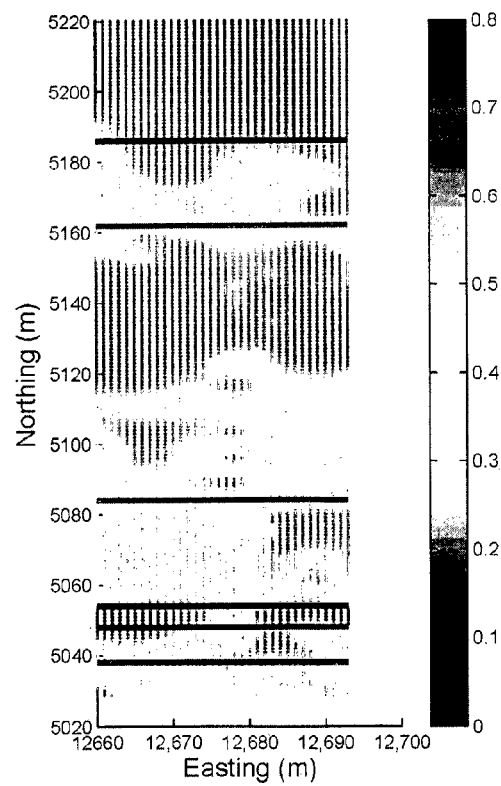
FIG. 10E shows detected rock types.

FIG. 10C is the 3D model mean value projected on a two dimensional plane. Then this 2D result is further projected to 1D (along the north axis) as shown in FIG. 10D, from which the rock type can be extracted by setting the threshold. In this example, the threshold for BIF/ore is 0.25 and ore/shale is 0.4. The extracted boundaries are shown in FIG. 10E.

Figure 11A:
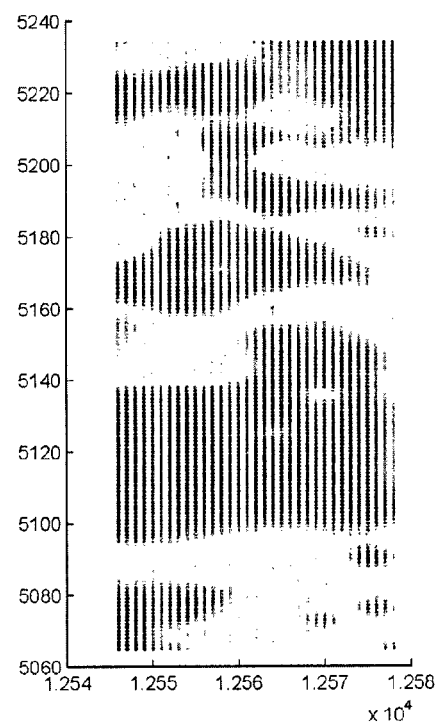
FIG. 11A shows an original penetration rate.
Figure 11B:
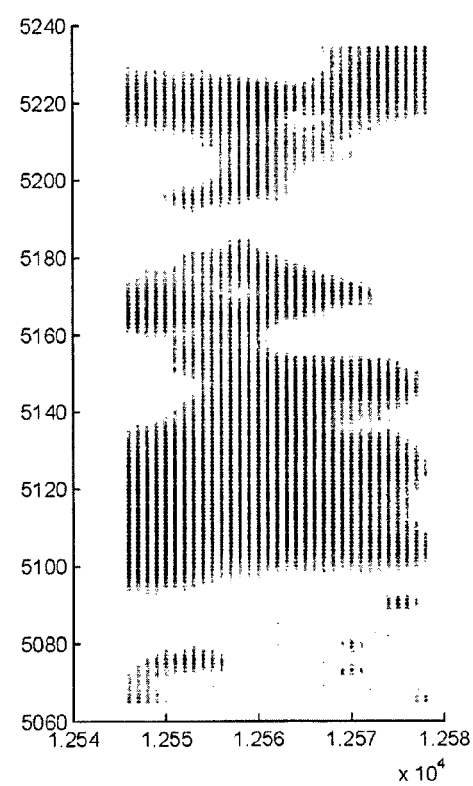
FIG. 11B shows an adjusted penetration rate.

In FIG. 11, comparison has been made between the 3D model based on the original penetration rate (FIG. 11A) and the adjusted penetration rate (FIG. 11B). The actual geology should be a wide shale zone in the middle with a narrow BIF zone on the northern end. The rest are the ore zones. From this we can see that the results of the adjusted penetration rate are more consistent with the actual geology.

Figure 12A:
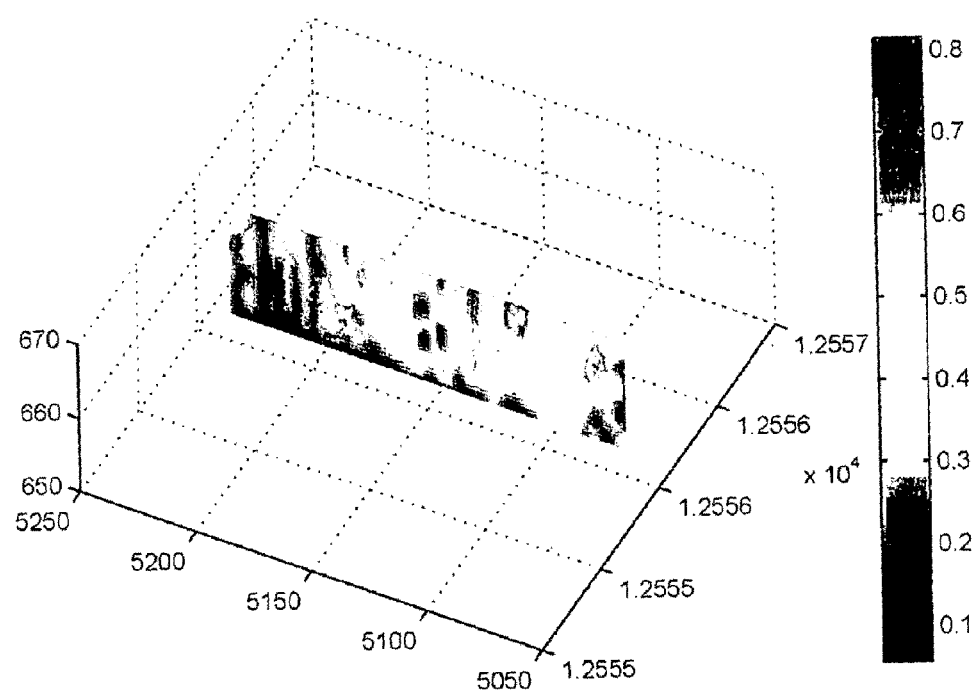
FIG. 12A shows an RBF kernel.
Figure 12B:
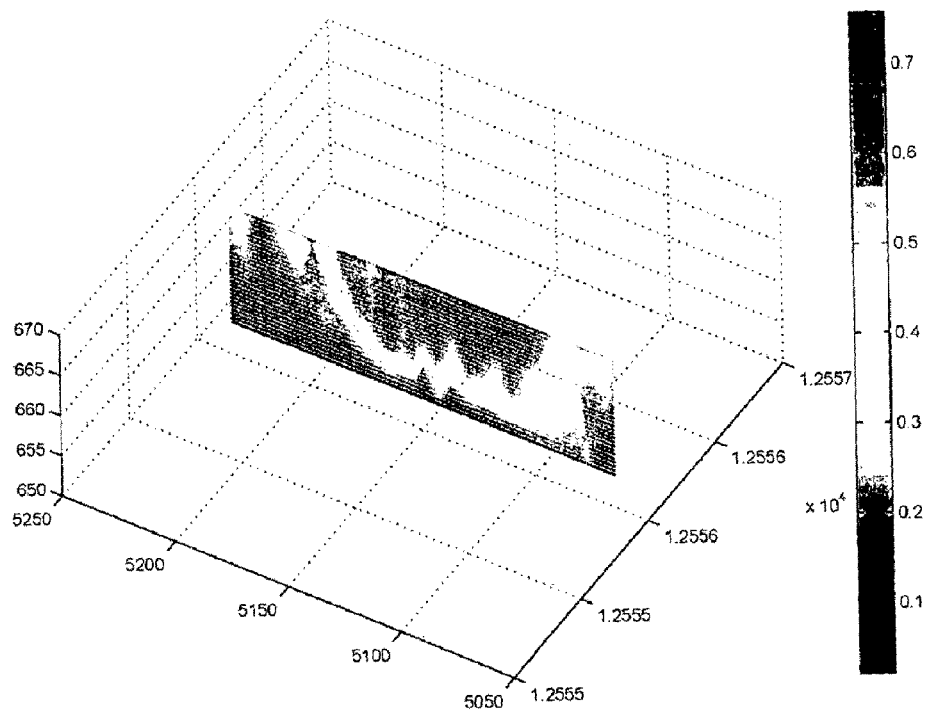
FIG. 12B shows an RQ kernel.

FIG. 12 shows a comparison of the 3D model derived from the popular Radial Basis Kernel (RBF) and the RQ kernel which has been used for our approach. The result from the RBF kernel in FIG. 12A tends to aggregate around the blast holes. The RQ result in FIG. 12B, on the other hand, is less localized compared with that of RBF, and hence is more consistent with the real world geology.

Throughout this specification, unless the context requires otherwise, the word "comprise", or variations such as "comprises" and "comprising", will be understood to imply the inclusion of a stated integer or group of integers but not the exclusion of any other integer or group of integers.

The foregoing detailed description of the present invention has been presented by way of example only and is not intended to limit the scope of the invention which includes each and every novel feature and combination of novel features herein disclosed.

What is claimed is:

1. A method for generating a continuous rock type distribution map characterizing in-ground rock types from measurement-while-drilling data in a mining environment, comprising:
    drilling holes at a plurality of selected locations within a region of interest;
    collecting measurements-while-drilling, the measurements comprising penetration rate, and at least one of pull down pressure and rotation pressure;
    determining, with a processor, from the collected measurements a discontinuous rock type distribution map comprising an array of characteristic measures indicative of rock hardness at various drilling depths in the drill hole locations;
    generating a continuous rock type distribution map from the discontinuous rock type distribution map by:
        applying the discontinuous rock type distribution map to a Gaussian process with a selected covariance function to generate a Gaussian process model with optimized hyperparameters;
        sampling the Gaussian process model by performing Gaussian process regression at a selected spatial resolution within the region of interest; and
        applying boundary detection to rock hardness output data obtained from the sampling of the Gaussian process model to identify the distribution of at least one cluster of rock type within the region of interest, the boundary detection based on received hardness data between at least a first rock type and a second rock type; and
        including the detected boundaries in the continuous rock type distribution map.

2. A method as claimed in claim 1 wherein characteristic measures indicative of rock hardness at a given location are calculated according to a corresponding penetration rate divided by the product of a pull down pressure and a rotation pressure square-root.

3. A method as claimed in claim 1 wherein the selected covariance function is a rational quadratic kernel.

4. A method as claimed in claim 1 wherein the boundary detection to identify rock type distribution includes applying at least one predetermined threshold value to the rock hardness output data obtained from the Gaussian process model.

5. A method as claimed in claim 1 wherein the operation of applying boundary detection includes performing unsupervised classification of the rock hardness output data.

6. A system for generating a continuous rock type distribution map of in-ground rock types from measurement-while-drilling data in a mining environment, comprising:
    a drill equipped with at least one sensor for generating measurement-while drilling-data, the measurements comprising penetration rate, and at least one of pull down pressure and rotation pressure;
    a processor for determining, from the measurements, a discontinuous rock type distribution map comprising an array of characteristic measures indicative of the hardness of the rock being drilled, and a spatial position sensor for generating spatial position information corresponding to the array of characteristic measures within a region of interest;
    a data storage for storing the discontinuous rock type distribution map, the array of characteristic measures and corresponding spatial position information;
    a training processor adapted to apply the discontinuous rock type distribution map to a Gaussian process with a selected covariance function to generate and store a Gaussian process model with optimized hyperparameters;
    an evaluation processor for sampling the Gaussian process model by performing Gaussian process regression at a selected spatial resolution within the region of interest; and
    a boundary processor for discerning and including detected boundaries in the continuous rock type distribution map of at least one rock type in the region of interest by applying boundary detection to rock hardness output data obtained from the sampling of the Gaussian process model to identify the distribution of at least one cluster of rock type within the region of interest, the boundary detection based on received hardness data between at least a first rock type and a second rock type.

7. A system as claimed in claim 6 wherein the array of characteristic measures indicative of rock hardness is calculated from the measurement outputs of a plurality of drill sensors.

8. A system as claimed in claim 7 wherein the plurality of drill sensors include sensors for measurements of drill penetration rate, pull down pressure and rotation pressure.

9. A system as claimed in claim 8 wherein the characteristic measures indicative of rock hardness are calculated according to the corresponding measured penetration rate divided by the product of pull down pressure and rotation pressure square-root.

10. A system as claimed in claim 6 wherein the selected covariance function is a rational quadratic kernel.

11. A system as claimed in claim 6 wherein the boundary detection processor operates to identify rock type distribution by applying at least one predetermined threshold value to the rock hardness output data obtained from the Gaussian process model.

12. A system as claimed in claim 6 wherein the boundary detection processor performs unsupervised classification of the Gaussian process output sample data.

13. A method for generating a continuous rock type distribution map of in-ground rock types in a mining environment, comprising:
    recording measurements from a plurality of drill sensors whilst drilling a plurality of holes through rock within a region of interest, the measurements comprising penetration rate, and at least one of pull down pressure and rotation pressure;
    using the recorded sensor measurements to generate, with a processor, a discontinuous rock type distribution map comprising an array of characteristic measures indicative of rock hardness at various drilling depths in the plurality of drill hole locations;
    applying the discontinuous rock type distribution map to a Gaussian process with a selected covariance function to generate a Gaussian process model with optimized hyperparameters;
    sampling the Gaussian process model by performing Gaussian process regression at a selected spatial resolution within the region of interest; and
    discerning the continuous rock type distribution map of in-ground rock types within the region of interest by applying boundary detection to the rock hardness sample data output from the Gaussian process model to identify the distribution of at least one cluster of rock type within the region of interest, the boundary detection based on received hardness data between at least a first rock type and a second rock type; and
    including the detected boundaries in the continuous rock type distribution map.

14. A method as claimed in claim 13 wherein the characteristic measures indicative of rock hardness are generated according to the corresponding drill penetration rate divided by the product of pull down pressure and rotation pressure square-root.

15. A method as claimed in claim 13 wherein the selected covariance function is a rational quadratic kernel.

16. A method as claimed in claim 13 wherein the boundary detection to identify rock type distribution includes applying at least one predetermined threshold value to the rock hardness sample data output obtained from the Gaussian process model.

17. A method as claimed in claim 13 wherein the operation of applying boundary detection includes performing unsupervised classification of the rock hardness output data.

18. A method for generating a continuous rock type distribution map characterizing in-ground rock types from measurement-while-drilling (MWD) data in a region of interest, comprising:
    measuring a set of data obtained while drilling a plurality of drill holes, the set of data comprising penetration rate, and at least one of pull down pressure and rotation pressure and associated with three-dimensional spatial information defined by the location of the drill holes and a corresponding depth of drilling;
    determining from the set of data a discontinuous rock type distribution map comprising an array of characteristic measures indicative of rock hardness;
    generating a continuous rock type distribution map from the discontinuous rock type distribution map by:
        training a Gaussian Process model using the discontinuous rock type distribution map as an input, to provide a model of rock hardness in the region of interest;
        sampling the model of rock hardness at a specified spatial resolution that is denser than a spatial resolution defined by the drill holes, to provide an inferred three-dimensional rock hardness distribution; and
        applying a classifier to the inferred rock hardness distribution to identify a distribution of at least one rock type within the region of interest, wherein a boundary of the at least one rock type is determined from the inferred three-dimensional rock hardness distribution, the boundary determination based on received hardness data between at least a first rock type and a second rock type; and
    including, in the continuous rock type distribution map, the identified distribution.

19. A method as claimed in claim 18 comprising:
    receiving a plurality of drill measurements descriptive of drill operation and associated with the three-dimensional spatial information, the plurality of measurements comprising pull down pressure and rotation pressure; and
    determining an adjusted value from the plurality of drill measurements, wherein
    the adjusted value is included in the set of data input to the Gaussian Process model.

20. The method of claim 19 wherein the adjusted value is calculated according to a corresponding penetration rate divided by the product of a pull down pressure and a rotation pressure square-root.

21. A computer program product comprising machine-readable program code recorded on a machine-readable recording medium, for controlling the operation of a data processing apparatus on which the program code executes to perform a method for generating a continuous rock type distribution map characterizing in-ground rock types from measurement-while-drilling (MWD) data in a region of interest, comprising:
    measuring a set of data obtained while drilling a plurality of drill holes, the set of data comprising penetration rate, and at least one of pull down pressure and rotation pressure and associated with three-dimensional spatial information defined by the location of the drill holes and a corresponding depth of drilling;
    generating a discontinuous rock type distribution map from the set of data obtained while drilling;
    generating a continuous rock type distribution map from the discontinuous rock type distribution map by:
        training a Gaussian Process model using the discontinuous rock type distribution map as an input, to provide a model of rock hardness in the region of interest;
        sampling the model of rock hardness at a specified spatial resolution that is denser than a spatial resolution defined by the drill holes, to provide an inferred three-dimensional rock hardness distribution; and
        applying a classifier to the inferred rock hardness distribution to identify a distribution of at least one rock type within the region of interest, wherein a boundary of the at least one rock type is determined from the inferred three-dimensional rock hardness distribution, the boundary determination based on received hardness data between at least a first rock type and a second rock type; and including, in the continuous rock type distribution map, the identified distribution.

22. A method for generating a continuous rock type distribution map characterizing in-ground rock types from measurement-while-drilling data in a mining environment, comprising:
drilling holes at a plurality of selected locations within a region of interest;
collecting measurements-while-drilling to obtain an array of data samples, the measurements comprising penetration rate, and at least one of pull down pressure and rotation pressure;
obtaining, with a processor, from the collected measurements a discontinuous rock type distribution map comprising a characteristic measure of the array of data samples indicative of rock hardness at various drilling depths in the drill hole locations;
generating a continuous rock type distribution map from the discontinuous rock type distribution map by:
performing Gaussian Process regression on the discontinuous rock type distribution map; and
applying boundary detection to the rock hardness output data obtained from the Gaussian process regression to identify the distribution of at least one cluster of rock type within the region of interest, the boundary detection based on received hardness data between at least a first rock type and a second rock type; and
including the detected boundaries in the continuous rock type distribution map.

23. A method as claimed in claim 22 wherein the operation of obtaining a characteristic measure of the array of characteristic measures is performed by determining an adjusted penetration rate.

24. The method of claim 23 wherein the adjusted penetration rate is calculated according to a corresponding penetration rate divided by the product of a pull down pressure and a rotation pressure square-root.

25. A method as claimed in claim 22 wherein the operation of applying boundary detection includes performing unsupervised classification of the rock hardness output data.

26. A method for generating a continuous rock type distribution map characterizing in-ground rock types from measurement-while-drilling data in a mining environment, comprising:
drilling holes at a plurality of selected locations within a region of interest;
collecting measurements-while-drilling, the measurements comprising penetration rate, and at least one of pull down pressure and rotation pressure;
determining, with a processor, from the collected measurements a discontinuous rock type distribution map comprising an array of characteristic measures indicative of rock hardness at various drilling depths in the drill hole locations;
generating a continuous rock type distribution map from the discontinuous rock type distribution map by:
applying the discontinuous rock type distribution map to a Gaussian process with a selected covariance function to generate a Gaussian process model with optimized hyperparameters; and
sampling the Gaussian process model by performing Gaussian process regression at a selected spatial resolution within the region of interest to provide a representation of rock hardness distribution
applying boundary detection to the representation of rock hardness distribution.

27. A method as claimed in claim 26 wherein the characteristic measures indicative of rock hardness are calculated according to a corresponding penetration rate divided by the product of a pull down pressure and a rotation pressure square-root.

28. A method as claimed in claim 26 wherein the representation of rock hardness is determined from rock hardness output data obtained from the sampling of the Gaussian process model.

29. A method as claimed in claim 26 wherein the boundary detection comprises identifying the distribution of at least one cluster of rock type within the region of interest.

* * * * *